(No Model.) 6 Sheets—Sheet 1.

W. C. BRAY.
MACHINE FOR SETTING LACING STUDS.

No. 277,985. Patented May 22, 1883.

Witnesses:
Walter E. Lombard
E. A. Hemmenway

Inventor:
Wm. Claxton Bray,
by N. C. Lombard
Attorney.

(No Model.) 6 Sheets—Sheet 2.

W. C. BRAY.
MACHINE FOR SETTING LACING STUDS.

No. 277,985. Patented May 22, 1883.

Witnesses:
Walter E. Lombard,
E. A. Hemmenway.

Inventor:
Wm. Claxton Bray,
by N. C. Lombard
Attorney.

(No Model.)  6 Sheets—Sheet 3.

W. C. BRAY.
MACHINE FOR SETTING LACING STUDS.

No. 277,985.  Patented May 22, 1883.

Witnesses:
Walter E. Lombard,
E. A. Hemmenway

Inventor:
Wm. Claxton Bray.
by N. C. Lombard
Attorney.

(No Model.) 6 Sheets—Sheet 5.
W. C. BRAY.
MACHINE FOR SETTING LACING STUDS.

No. 277,985. Patented May 22, 1883.

Witnesses:
Walter E. Lombard.
E. A. Hemmenway.

Inventor:
Wm. Claxton Bray,
by N. C. Lombard
Attorney.

(No Model.) 6 Sheets—Sheet 6.

W. C. BRAY.
MACHINE FOR SETTING LACING STUDS.

No. 277,985. Patented May 22, 1883.

Witnesses:
Walter E. Lombard
E. A. Hemmenway

Inventor:
Wm. Claxton Bray,
by N. C. Lombard
Attorney.

UNITED STATES PATENT OFFICE.

WILLIAM CLAXTON BRAY, OF NEWTON, MASSACHUSETTS.

MACHINE FOR SETTING LACING-STUDS.

SPECIFICATION forming part of Letters Patent No. 277,985, dated May 22, 1883.

Application filed January 8, 1883. (No model.)

*To all whom it may concern:*

Be it known that I, WILLIAM CLAXTON BRAY, of Newton, in the county of Middlesex and State of Massachusetts, have invented certain new and useful Improvements in Machines for Setting Lacing Studs or Hooks, of which the following, taken in connection with the accompanying drawings, is a specification.

My invention relates to a power-machine for separating, feeding, and setting shoe-lace studs or hooks; and it consists in certain improvements in the construction and arrangement of the several parts and in the mode of operating them, which will be best understood by reference to the description of the drawings, and to the claims to be hereinafter given.

Figure 1:
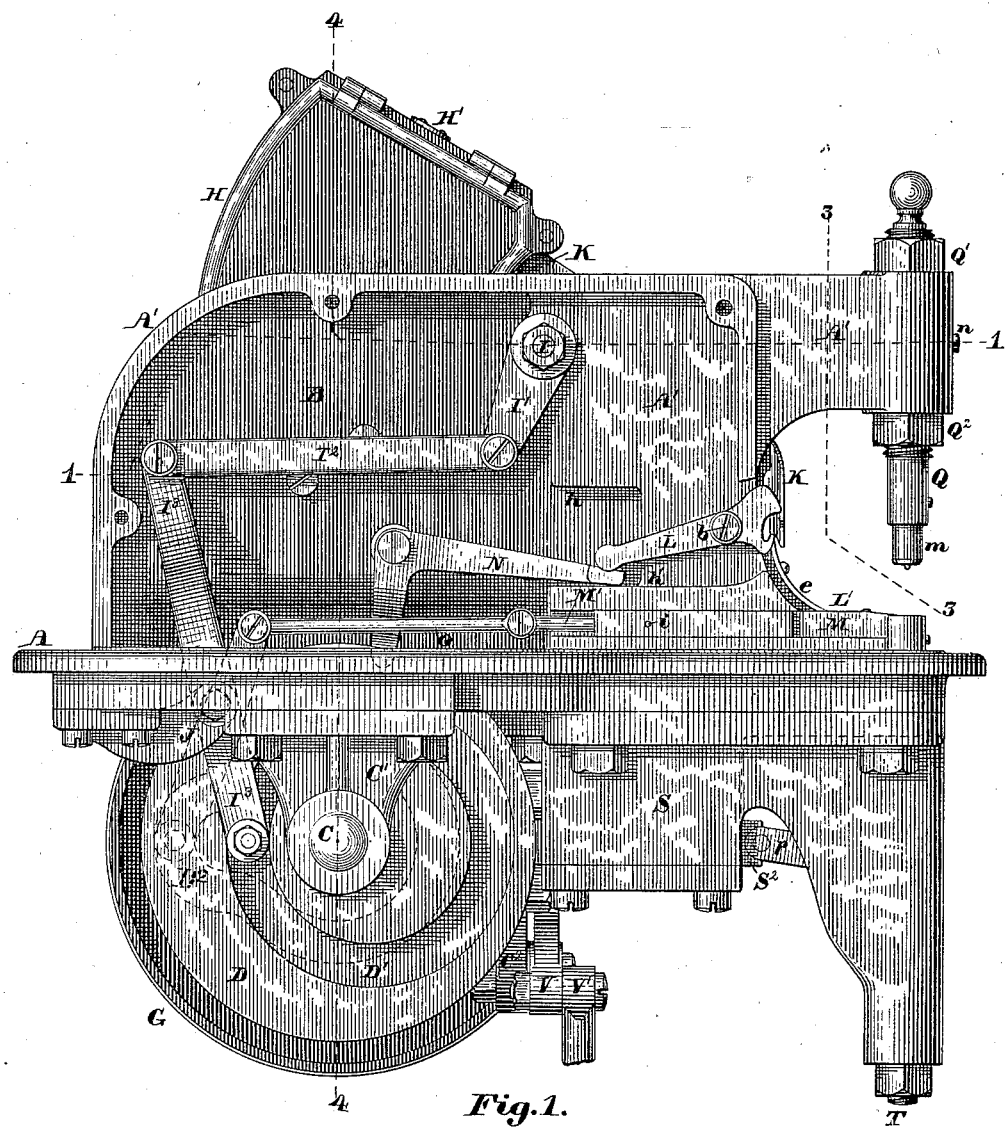
Figure 2:
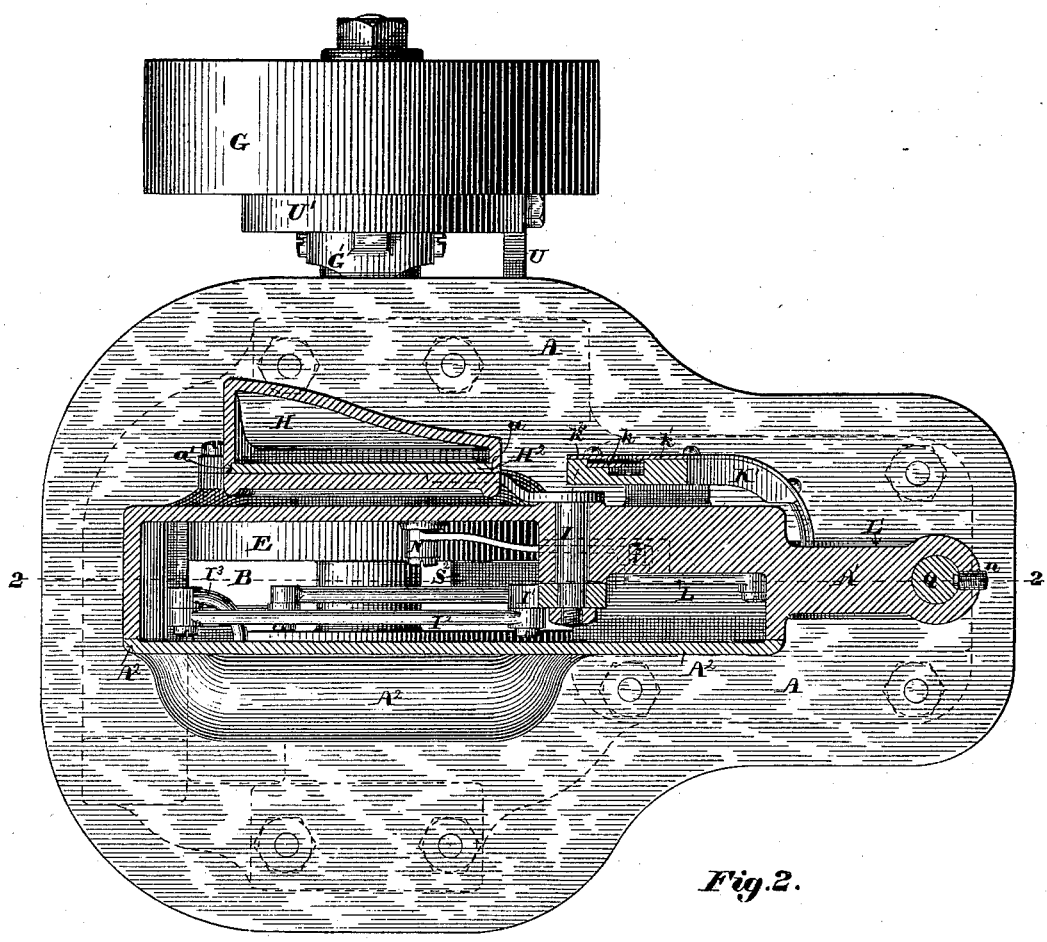
Figure 5:
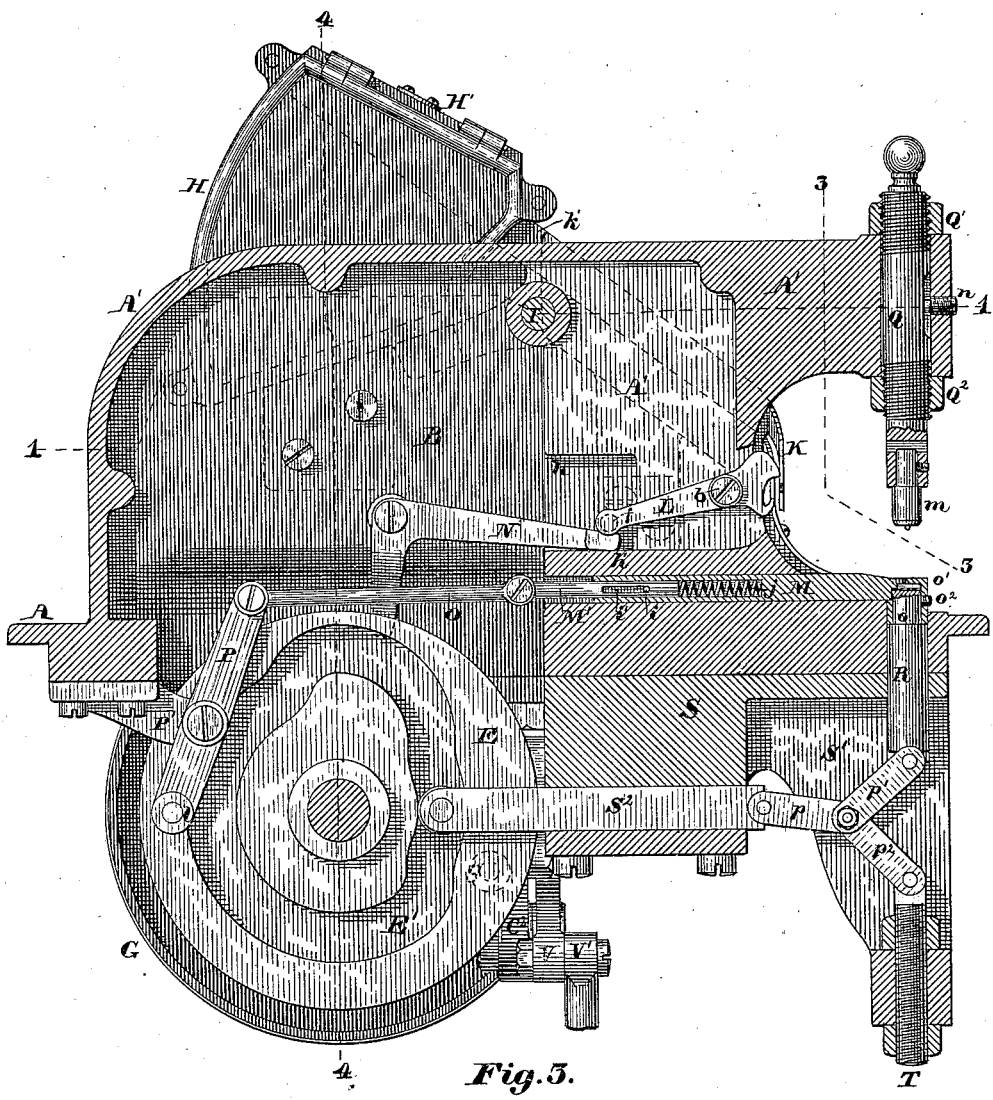
Figure 4:
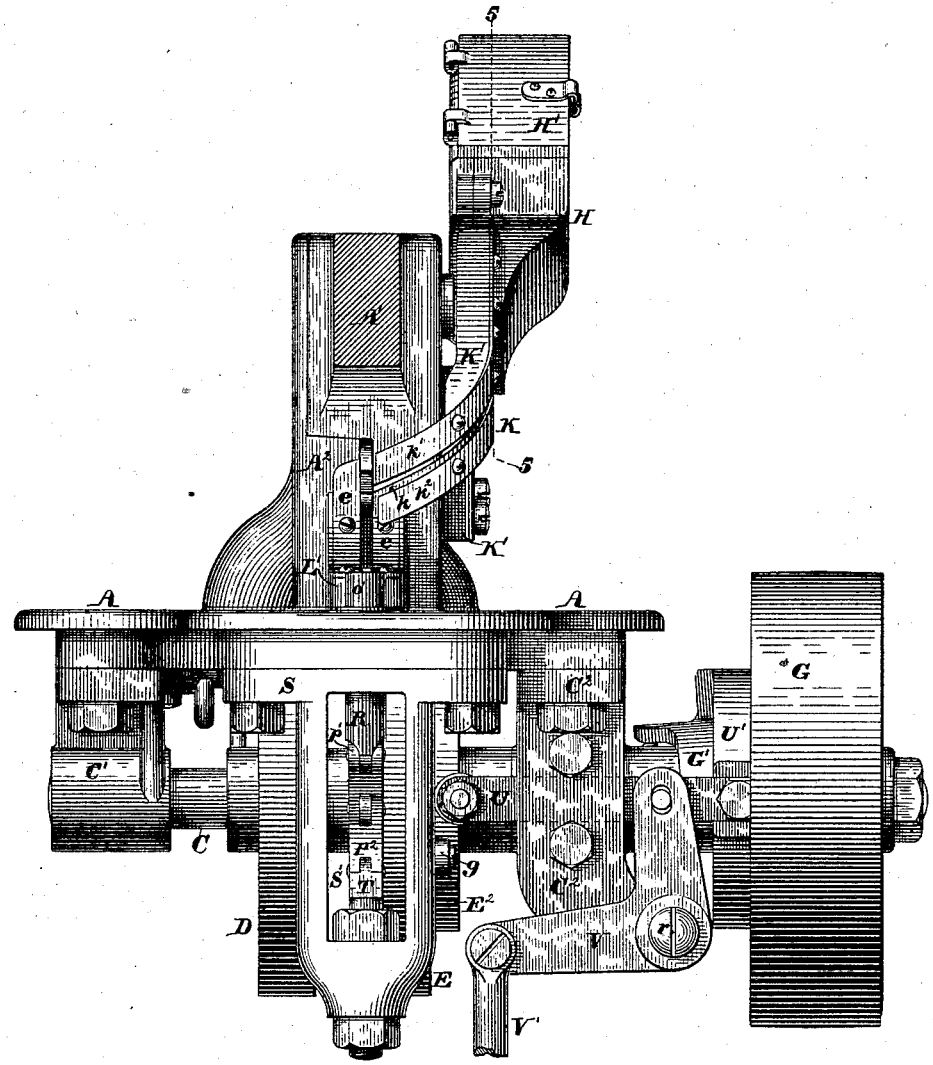
Figure 5:
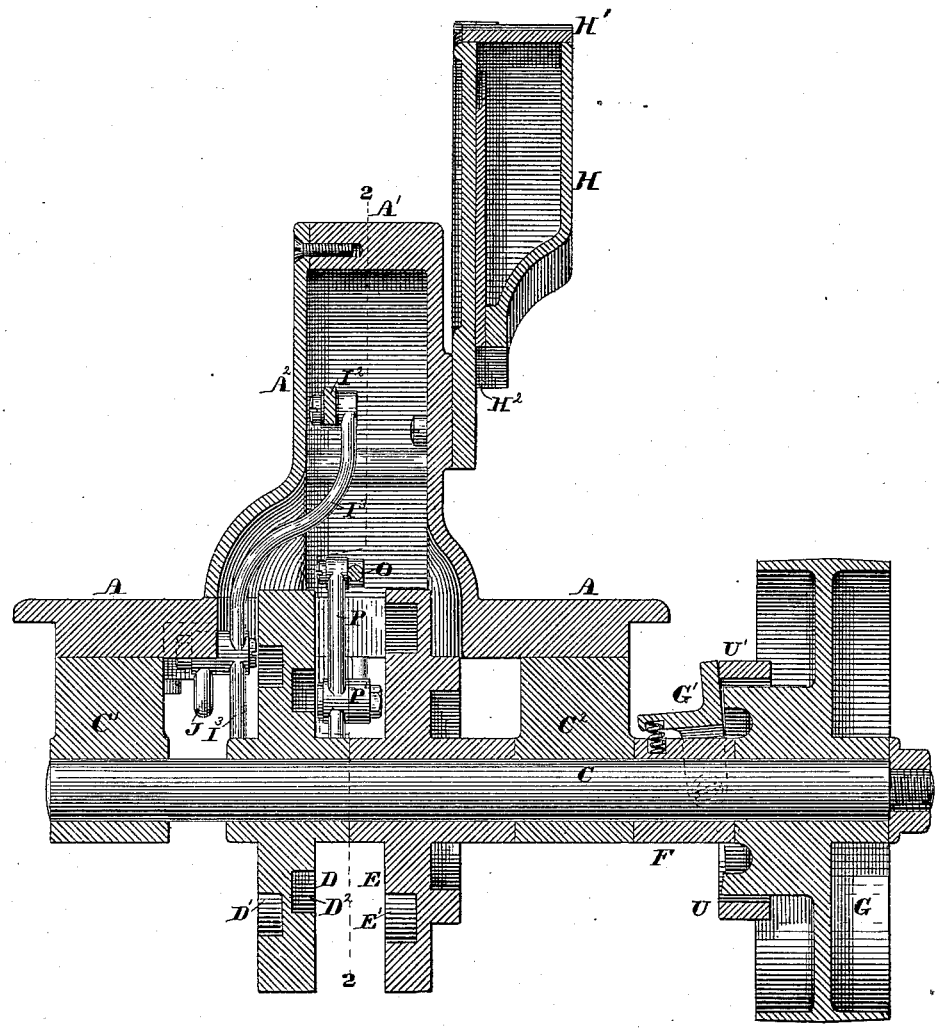
Figures 6, 11:
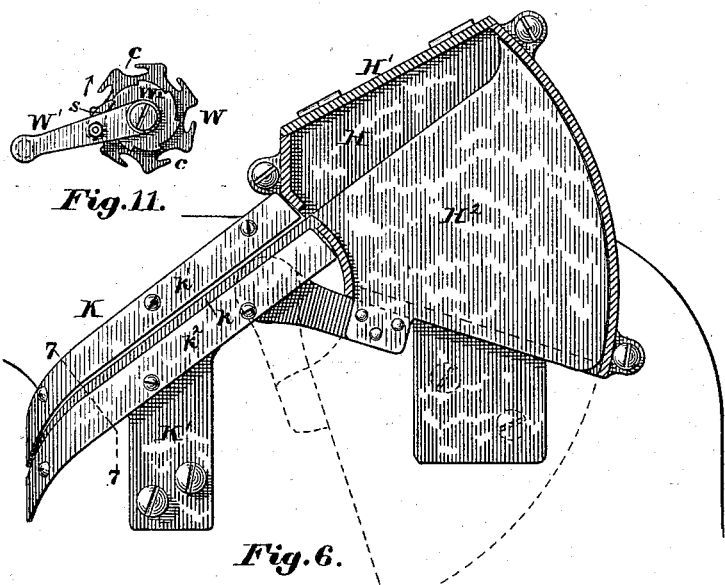
Figures 7, 8, 10:
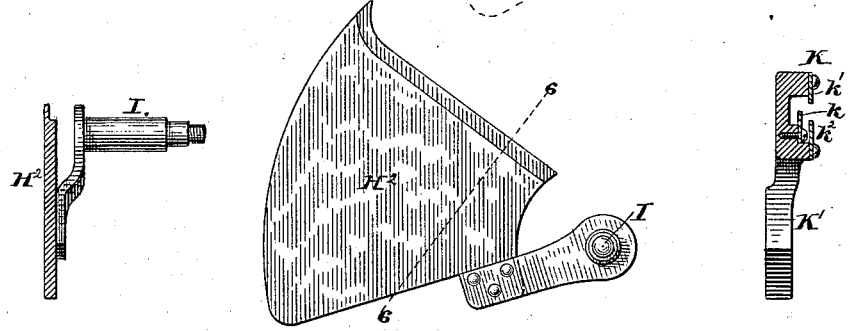
Figures 12, 13, 14:
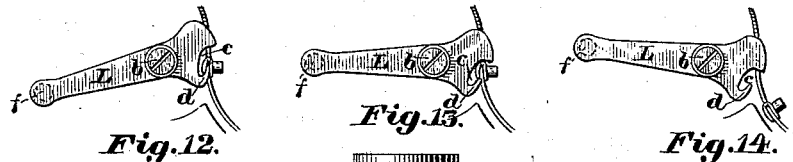
Figure 9:
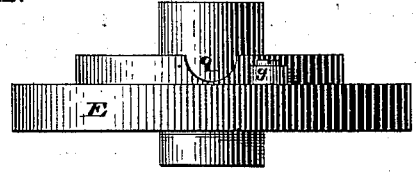

Figure 1 of the drawings is a side elevation of a machine embodying my invention with the side covering-plate removed. Fig. 2 is a sectional plan of the same, the cutting-plane being on line 1 1 on Figs. 1 and 3. Fig. 3 is a vertical section on line 2 2 on Fig. 2. Fig. 4 is a front end elevation with the front part of the goose-neck cut away on line 3 3 on Figs. 1 and 3. Fig. 5 is a vertical section on line 4 4 on Figs. 1 and 3. Fig. 6 is a vertical section of the hopper on line 5 5 on Fig. 4, and showing the inclined chute in elevation. Fig. 7 is an elevation of the lifter-blade and its carrying-arm and shaft, and Fig. 8 is a sectional elevation of the same on line 6 6 on Fig. 7. Fig. 9 is an edge view of the cam E, and showing the detent notch for arresting the motion of the cam-shaft. Fig. 10 is a transverse section of the inclined chute on line 7 7 on Fig. 6. Fig. 11 illustrates a modification of the device for separating a single stud from a series arranged in line, and Figs. 12, 13, and 14 are views illustrating three different positions of the separating-lever during the operation of separating the front stud or hook in a line of studs or hooks from those in the rear of it.

A is the bed-plate of the machine, arranged to rest upon a bench or table, and having cast therewith and projecting upward therefrom the goose-neck A', in which is formed the chamber B, to receive portions of the movable parts of the mechanism, and to which access may be had by removing the side plate, A², secured thereto by screws, as shown, or by any other suitable fastening device.

C is the driving-shaft, mounted in bearings in the pendent stands C' and C², secured to the under side of the bed A, said shaft having firmly secured thereon, so as to revolve therewith, the cams D and E and the collar F, and also having mounted loosely thereon the pulley G, provided upon the inner end of its hub with one or more clutch-teeth, (not shown,) with which the spring-actuated dog G', pivoted to the collar F, engages to compel said shaft to revolve with said pulley, all as shown in Fig. 5.

H is a hopper of peculiar shape, secured in a fixed position to the side of the goose-neck or upper portion of the frame A', and provided with a hinged cover, H', to give access to the interior of the hopper for introducing the studs or hooks to be set, and a slot through its bottom, and extending from end to end thereof, through which moves the lifter-plate H², constructed as shown and described, and mounted upon the short shaft I, about the axis of which said plate is vibrated edgewise, its curved edges, which are concentric to the axis of said shaft, moving in grooves *a* and *a'*, formed in the curved end walls of said hopper, as shown in Fig. 2. The opposite end of the shaft I has secured thereon the lever I', connected at its movable end, by the link I², to the upper end of the lever I³, pivoted to the stand J, and carrying at its lower end a stud or truck, which projects into and is acted upon by the path D' of the cam D, to impart thereto, and, through the link I², lever I', and rocker-shaft I, to the lifter-plate H², a vibratory motion. The hopper H is also provided with an opening in its front curved end wall, of a size and shape corresponding to an elevation of the lacing stud or hook to be operated upon by the machine, when viewed from the side, with its neck uppermost, said opening being so located in said hopper that a stud or hook hanging by its neck upon the upper edge of the plate H² will slide therefrom and through said opening when said plate has reached the extreme of its upward movement.

K is a curved inclined chute composed of three plates, *k*, *k'*, and *k²*, arranged relative to each other in the same manner as described in Letters Patent No. 261,527, granted to me July 25, 1882, said plates being secured to the stand K', bolted in a fixed position to the goose-neck A', the upper end of said chute being so located relative to the opening in the side of the hopper that the studs or hooks, when discharged from said hopper, shall be received by said chute and guided thereby in their passage till they are discharged from its lower end.

L is a lever pivoted to the goose-neck A' at $b$, and having formed in the end of its short arm, which projects through a slot in said goose-neck, a peculiarly-shaped slot, $c$, adapted to receive the head of a stud or hook as it slides down the inclined chute K and is discharged from its lower end, the neck of said lacing stud or hook resting upon the point of the hook $d$ of said lever, as shown in Figs. 12, 13, and 14. The short arm of the lever L is made of such a thickness as to permit but one lacing stud or hook to enter the slot $c$ and rest upon the hook $d$ at the same time, and of such a width above the slot $c$ as to serve as a guard to prevent the remaining lacing studs or hooks upon the chute K from being discharged therefrom until the slot $c$ is again brought into a position opposite the end of said chute, after having been depressed to discharge the lacing stud or hook previously received from said chute. The hook $d$ of the lever L lies between and in the same plane with the upper ends of the guiding-plates $e$ $e$ of the curved roadway L', which plates extend downward and forward from the end of the chute K to the setting-tools, and receive the lacing studs or hooks from the lever L when its short arm is depressed and guide them to the setting-tools in the desired position to be acted upon thereby.

The plate $e$ upon the side of the roadway L' opposite to the lower end of the chute K extends upward to a point as high as the top of the slot $c$ in the lever L, when the short arm of said lever is raised to its highest position, and serves as an abutment to check the movement of the lacing hook or stud when it is discharged from the chute K, a portion of the head of the stud or hook passing behind the said plate, while the inner collar of the head is outside or in front of said plate, so that as the short arm of the lever L is depressed the two plates $e$ $e$, embracing the neck of the lacing stud or hook, compel it to follow the roadway L' in its downward movement, and as the hook $d$ of the lever L moves downward in a path curved in a direction opposite to the curve of the roadway L', it follows that the hook $d$ of the lever L will be withdrawn from the neck of the lacing stud or hook, thus allowing said lacing stud or hook to descend the curved roadway L' to a position to be struck by the reciprocating plunger M, and be fed thereby into a position between the setting-tools.

The rear or long arm of the lever L has set therein a stud or pin, $f$, (shown in dotted lines in Figs. 2 and 3,) which projects over and is acted upon by the movable end of the horizontal arm of the elbow-lever N, the other arm of which is struck at each revolution of the main or driving shaft by the anti-friction roll $g$, mounted upon a stud set in the side of the cam E in a position eccentric to the axis of said cam, and arranged to revolve about said axis, and by contact with the pendent arm of the lever N to cause the horizontal arm of the lever N and the long arm of the lever L to be raised and the short arm of the lever L to be depressed. When the roll $g$ has passed the short or vertical arm of the lever N the extra weight of the long arms of the levers L and N, acted upon by the force of gravity, causes said levers to assume their original positions.

If desired, a spring may be applied to the long arm of the lever L to insure the return of said lever to its original position in proper time to receive another lacing-stud from the chute K before the lever N is again struck by the roll $g$.

The extent of vibration of the levers L and N is limited in an upward direction by the pin $f$ striking the shoulder $h$, formed in the interior of the chamber B of the goose-neck A', and in a downward direction by the free end of the horizontal arm of the lever N resting upon the ledge $h'$ in the same chamber, as shown in Figs. 1 and 3.

The horizontal feed-plunger is made in two parts, M and M', the latter in the form of a plunger fitted to a hole bored in the rear end of the former, so as to work therein like a piston, and the two parts connected by the pin $i$, set in the part M, and passing through a longitudinal slot, $i'$, in the part M', so that a limited amount of movement of the part M' within the part M may be permitted in case of an obstruction interfering with the proper movement of the part M, a spring, $j$, being inserted between the inner end of the rod M' and the bottom of the hole in the part M in which it works, of sufficient stiffness to insure the proper feeding of a single stud or hook to the setting-tools when properly presented, and adapted to yield so as to permit the revolution of the operating-cam without breaking the machinery if any obstruction prevents the part M from completing its stroke.

O is a connecting rod or link pivoted at one end to the rod M' and at its other end to the upper end of the lever P, having its fulcrum upon the stand P', secured to the under side of the bed A, and carrying at its other end a truck, $l$, which fits into and is acted upon by the path $D^2$ of the cam D to impart to the feed-plunger M M' a reciprocating motion, all as shown in Figs. 1, 3, and 5.

In setting tubular rivets it has been common to use a carrier provided with a pocket to receive the head of the rivet as it was delivered thereto from the chute, said carrier moving with the setting-plunger to guide the rivet to the proper position in contact with the stock when the movement of said carrier ceased, and the setting-plunger continued its motion to force the rivet endwise from the carrier through the stock, and to clinch the same, said setting-plunger acting directly upon the head of the rivet. The setting of a shoe-lace stud or hook having a tubular shank presented, however, a different problem, as the pressure required to set the stud could not be applied directly to the end or outer head of the hook or stud without ruining said hook or stud, and therefore it became necessary to so construct the anvil that the pressure for forcing the shank through the material and clinching it should be applied to the inner head or disk of the stud or hook. To this end the anvil was provided with a pocket or recess cut in its side to receive the outer head of the stud or hook, and a slot cut from said pocket to the end of the anvil, and said anvil was arranged in a fixed position, with its pocket and slot coinciding with the end of the roadway through which the hook or stud was fed thereto, in which position it remained till the stud or hook was clinched. When this was done the head of the hook or stud was fast in the anvil, and could only be removed by raising the anvil, as described in Letters Patent No. 244,738, granted to me July 26, 1881, or by opening the sides or front of the pocket, as had been practiced prior to my said invention. To obviate the necessity of lifting the anvil, as in my said patent, or making the anvil with spring-jaws which would open to permit the withdrawal of the hook or stud from the anvil after it was clinched to the material, I set the clinching-tool $m$ in the threaded spindle Q, adjustably secured in the goose-neck A' by the nuts Q' and $Q^2$, and prevented from turning in its bearing, while being adjusted, by the set-screw $n$, the point of which enters a short groove cut in the side of the spindle, as shown in Figs. 2 and 3. I also attach the anvil $o$ and its cap $o'$, secured thereto by the set-screw $o^2$, to a vertically-reciprocating plunger, R, set in a bearing in the bed A, and the upper portion of the stand S bolted to the under side of the bed A and projecting downward therefrom. The front portion of the stand S has formed therein the slot S', and the rear portion has formed therein a bearing for the reciprocating bar $S^2$, which carries at its rear end a truck which fits into and is acted upon by the path E' of the cam E, and is connected at its front end to the link E, which in turn is pivoted to the toggle-links $p$, $p'$ and $p^2$, the opposite ends of which are connected, respectively, to the plunger R and the adjustable stud T, set in the lower cross-bar of the stand S, as shown in Figs. 3 and 4.

The anvil $o$ has formed in its upper end a recess, extending from the rear side thereof toward the front, of suitable shape and size to receive the outer head of the lacing-stud, and permit the stud to be fed to a position in axial line with the setting-tools, and no farther, while the cap $o'$ has a slot cut through its rear upper corner, of a shape to receive the outer head and the neck of the stud, while the inner head or collar of the stud rests upon the top of the anvil-cap $o'$ in a well-known manner.

U is a shipper-bar mounted in a bearing in the stand $C^2$, and carrying at one end the ring U', firmly secured thereto and surrounding the inner hub of the loose pulley G, just inside of the upright portion of the dog G', and at its opposite end a truck or stud which engages with the detent-notch $q$, formed in the edge of the annular rib $E^2$, cast upon the side of the cam E.

V is an elbow-lever pivoted at $r$ to the cap of the stand $C^2$, and connected at one end to the bar U and at the other end to the rod V', the lower end of which is connected to a treadle, (not shown,) by depressing which the bar U may be moved toward the pulley G, carrying with it the ring U' and removing the locking pin or truck from the detent-notch $q$, thus allowing the dog G' to be moved by its spring into a position to be engaged by a tooth on the hub of the pulley G, and thus cause the shaft C to be revolved. The treadle is moved upward by a spring (not shown) of sufficient power to move the treadle, the rod V', lever V, bar U, the ring U', and the dog G' against the resistance of the spring which actuates the dog to move it into engagement with the pulley G.

In Fig. 11, illustrating a modification of the hook-separating device, W is a wheel having formed in its periphery a series of slots or pockets, $c$ $c$, of the same shape as that shown in the lever L, said wheel being adapted to be mounted upon the same axis as the lever L, and to be intermittently moved about said axis, in the direction indicated by the arrow, by means of the lever W', mounted loosely upon said axis, the pawl $s$, pivoted to said lever, and the ratchet-wheel $W^2$, secured to the wheel W or to its axis, so that the two wheels W and $W^2$ shall be compelled to revolve in unison.

The peculiarity of the shape of the hopper H is clearly shown in Figs. 5 and 6, by examining which it will be seen that it has one straight vertical side, contiguous to which the segmental plate $H^2$ moves up and down, vibrating about an axis located outside of said hopper, two curved sides parallel to each other and concentric to the axis about which said plate vibrates, and a fourth side, the upper portion of which is parallel to the straight vertical side, and the lower portion of which is curved inward, so as to approach much nearer to said straight side than said upper portion, whereby the studs or hooks contained therein are concentrated in a narrow space at the bottom of the hopper, in position to be taken up by the upper edge of the plate $H^2$ as it is moved upward from its lowermost position—$i.$ $e.$, with its upper edge flush with the interior of the bottom of the hopper — said position being shown in dotted lines in Fig. 6.

The upper edge of the plate $H^2$ is rabbeted or reduced in thickness upon the side next to the straight vertical side of the hopper to form a space for the outer head or button of the stud or hook when it hangs upon said plate by its neck, with its tubular shank projecting horizontally therefrom toward the center of the hopper.

By the construction and arrangement of the hopper and lifting-plate above described the passage of the plate $H^2$ upward through the mass of studs or hooks contained in the hopper H will cause certain of the studs or hooks to be carried upward, thereby hanging by their necks upon the edge of the plate H², with their shank ends all in one direction and pointing away from the straight vertical wall of the hopper, and when said plate has reached the limit of its upward movement, or its upper edge is inclined toward the opening in the hopper, said studs or hooks will slide down said plate through said opening in the hopper and down the inclined chute. If any studs or hooks are carried upward by said plate that are not hanging by their necks, as above described, they will be thrown therefrom as the plate rises, and fall into the hopper, to be again taken up by said blade at some subsequent upward movement thereof.

The lifting-plate H² is shown in the drawings with its upper edge rabbeted or reduced in thickness, so that it may enter the space between the head or collar of a lacing stud or hook, and to form a space between said upper portion of the plate and the straight vertical wall of the hopper to receive the head of the stud or hook which hangs by its neck upon said plate, the main body of said plate being made of such a thickness that it is contiguous to said straight vertical wall; but it is obvious that said plate may be of even thickness throughout, not greater than the distance between the head and collar of the stud or hook, and be located at a distance from the vertical wall of the hopper equal to or slightly greater than the thickness of the stud-head, without departing from the principles of my invention.

What I claim as new, and desire to secure by Letters Patent of the United States, is—

1. In a machine for setting shoe-lace studs or hooks, the lever L, provided with the slot c and hook d, and adapted to be vibrated about its fulcrum as a means of separating a single stud from a series of studs arranged in line, substantially as described.

2. The hopper H, having one straight vertical side, two curved or segmental sides parallel with each other, and a fourth side, the lower portion of which is curved inward to contract the bottom of the hopper, substantially as and for the purposes described.

3. The segmentally-shaped hopper H, provided with a slot extending through the whole interior length of its bottom, in combination with the segmental blade H², mounted upon and adapted to be vibrated about an axis corresponding to the center of the curves of the segmental sides of said hopper, and rise and fall through said slot in the bottom of the hopper, substantially as described.

4. The combination of the fixed segmentally-shaped hopper H, the lifting-blade H², rocker-shaft I, levers I' and I³, the link I², and the cam E', all arranged and adapted to operate substantially as described.

5. In combination with an inclined chute in which the studs or hooks are arranged in line, with their axes in horizontal positions, and a curved roadway adapted to turn said studs or hooks from said horizontal position to a position with their axes vertical and their tubular shanks upward, a separating device consisting of a head-receiving slot and a neck-receiving hook, and located between the lower end of the inclined chute and the upper end of the curved roadway, and mechanism for intermittently moving said separator from a position to receive a stud or hook from the inclined chute to a position to deliver said stud or hook to the curved roadway and return said separator to its former position.

6. In combination with an inclined chute in which the studs or hooks are arranged in line, with their axes in horizontal positions, and a curved roadway adapted to turn said hooks or studs from said horizontal position to a position with their axes vertical and their tubular shanks upward, a pivoted separating device, substantially as set forth, located between the lower end of the inclined chute and the upper end of the curved roadway, and provided with one or more head-receiving pockets or slots, and means for imparting thereto an intermittent movement about its axis, whereby it is adapted to receive a stud from the chute and discharge it into the roadway, substantially as described.

7. The combination of the clinching-tool $m$, adjustably secured in a fixed position, the anvil $o$ $o'$, provided with a pocket to receive the outer head or button of the lacing stud or hook, mechanism for imparting to said anvil an intermittent reciprocating motion, the yielding plunger M M', and mechanism for imparting to said plunger an intermittent reciprocation in a direction at right angles to the motion of the anvil, substantially as and for the purposes described.

8. In combination with an inclined chute in which the studs or hooks are arranged in line, with their axes in horizontal positions, and a curved roadway adapted to turn said studs or hooks from said horizontal position to a position with their axes vertical and their tubular shanks upward, the lever L, provided with the head-receiving slot c, the lever N, and means for imparting to said levers an intermittently-vibrating motion, substantially as described.

9. The combination of a hopper having one straight vertical side and an opposite side curved or inclined so as to contract its bottom, and a pivoted lifting-blade arranged in near proximity to and parallel with said straight vertical side of the hopper, and adapted to be vibrated edgewise about an axis outside of said hopper and to take up one or more lacing hooks or studs by their necks, with their heads between said plate and said straight vertical wall, substantially as and for the purposes described.

In testimony whereof I have signed my name to this specification, in the presence of two subscribing witnesses, on this 4th day of January, A. D. 1883.

W. CLAXTON BRAY.

Witnesses:
E. A. HEMMENWAY,
WALTER E. LOMBARD.